No. 613,563. Patented Nov. 1, 1898.
P. DWYER, E. S. ANDERSON & J. MELLINA.
MAIL BAG DELIVERY MECHANISM.
(Application filed Aug. 14, 1897.)

(No Model.) 2 Sheets—Sheet 1.

Witnesses
James F. Duhamel
Victor J. Evans

Inventors:
PETER DWYER,
EDWARD S. ANDERSON,
JOSEPH MELLINA,
By John Wedderburn
Attorney No. 613,563. Patented Nov. 1, 1898.
P. DWYER, E. S. ANDERSON & J. MELLINA.
MAIL BAG DELIVERY MECHANISM.
(Application filed Aug. 14, 1897.)
(No Model.) 2 Sheets—Sheet 2.
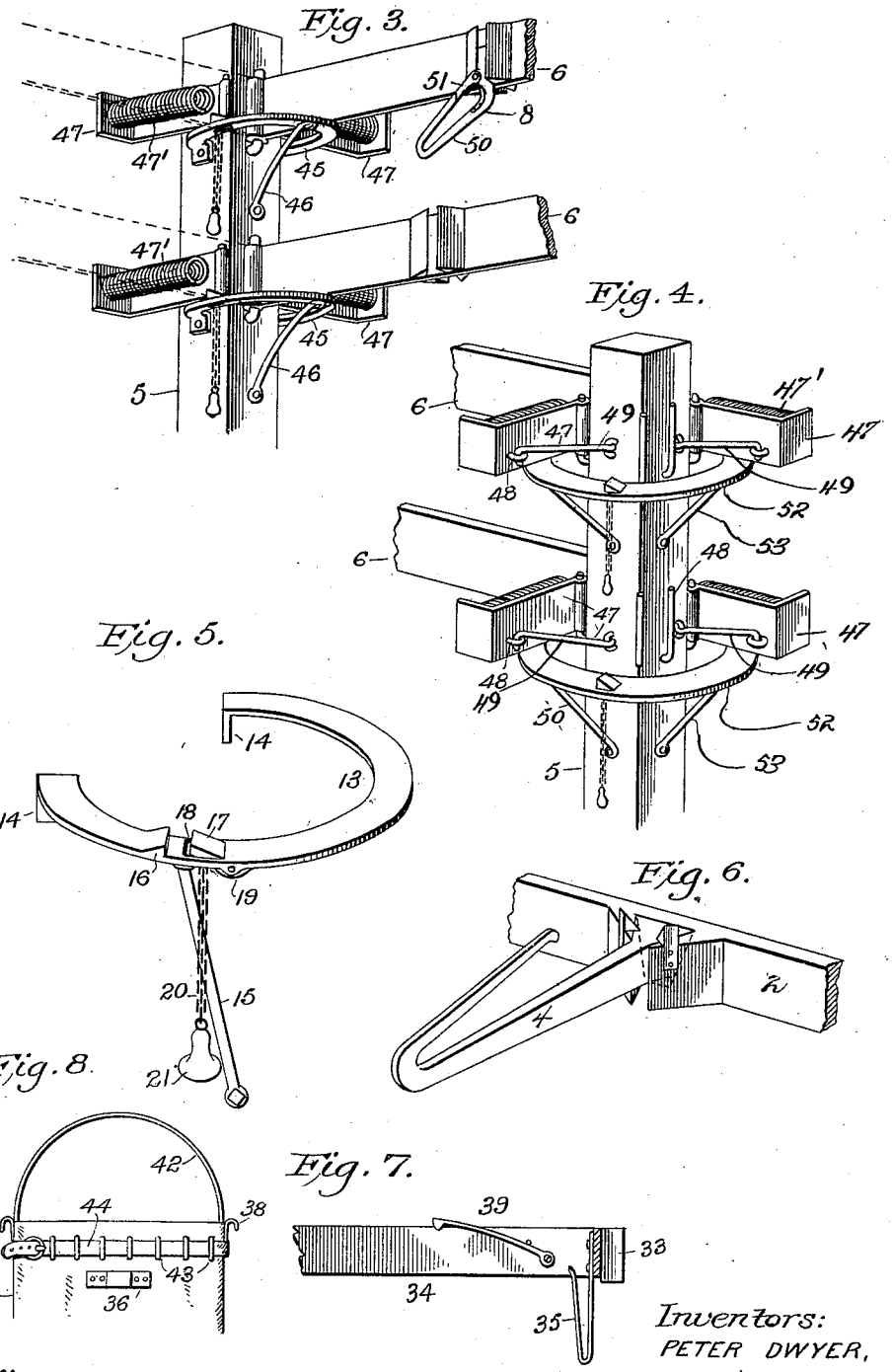
Witnesses
James F. Duhamel
Victor J. Evans
Inventors:
PETER DWYER,
EDWARD S. ANDERSON,
JOSEPH MELLINA,
by John Wedderburn
Attorney

UNITED STATES PATENT OFFICE.

PETER DWYER, EDWARD S. ANDERSON, AND JOSEPH MELLINA, OF NEW YORK, N. Y.

MAIL-BAG-DELIVERY MECHANISM.

SPECIFICATION forming part of Letters Patent No. 613,563, dated November 1, 1898.

Application filed August 14, 1897. Serial No. 648,293. (No model.)

*To all whom it may concern:*

Be it known that we, PETER DWYER and EDWARD S. ANDERSON, of New York, (Brooklyn,) Kings county, and JOSEPH MELLINA, of New York, (Corona,) in the county of Queens, State of New York, have invented certain new and useful Improvements in Mail-Bag-Delivery Mechanism; and we do hereby declare the following to be a full, clear, and exact description of the invention, such as will enable others skilled in the art to which it appertains to make and use the same.

This invention relates to attachments for mail-cars.
The invention consists of the combination, with a swinging arm adapted for attachment to a car, of a bag-support mounted on said arm, a bag-engaging hook also mounted on said arm, a standard adapted to be mounted at the side of the road-bed, arms mounted on said standard, a bag-supporting device mounted on one of said standard-arms, and a bag-hook mounted on the other standard-arm.
The invention also consists of certain novel constructions, combinations, and arrangements of parts, all of which will be hereinafter more particularly set forth and claimed.

Figure 1:
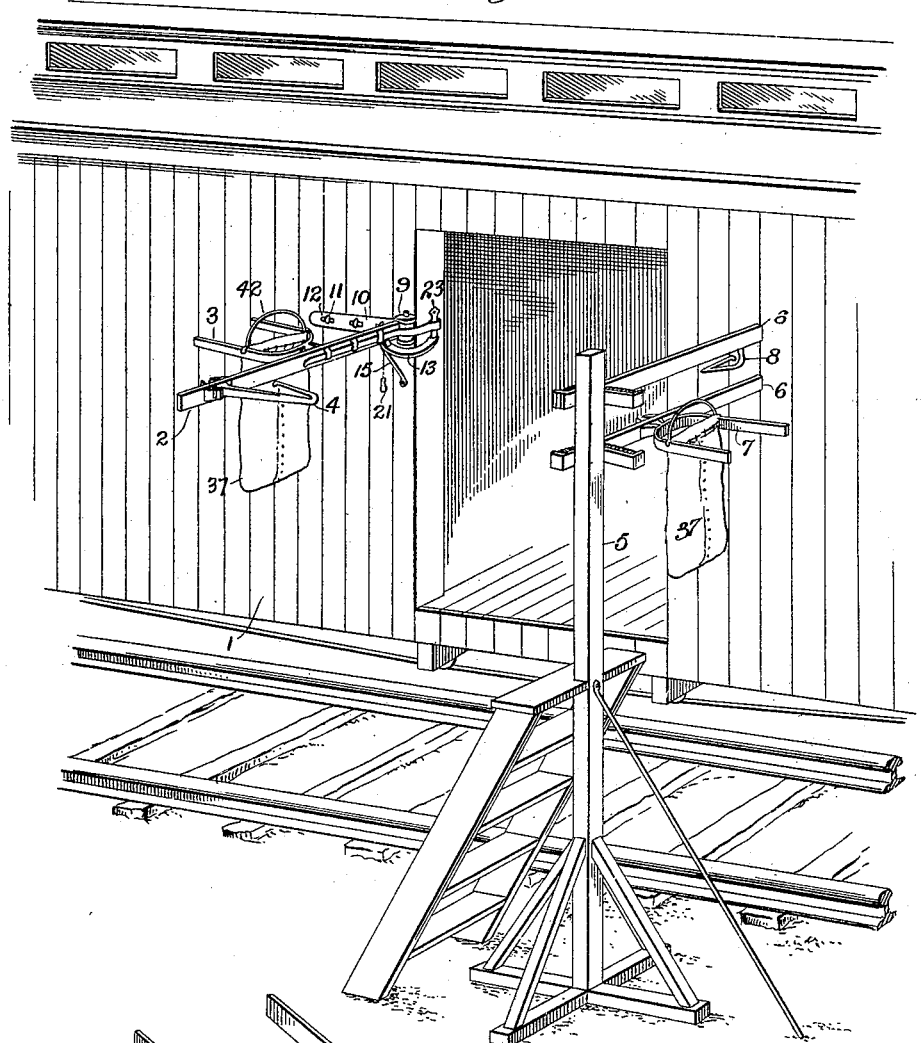
Figure 2:
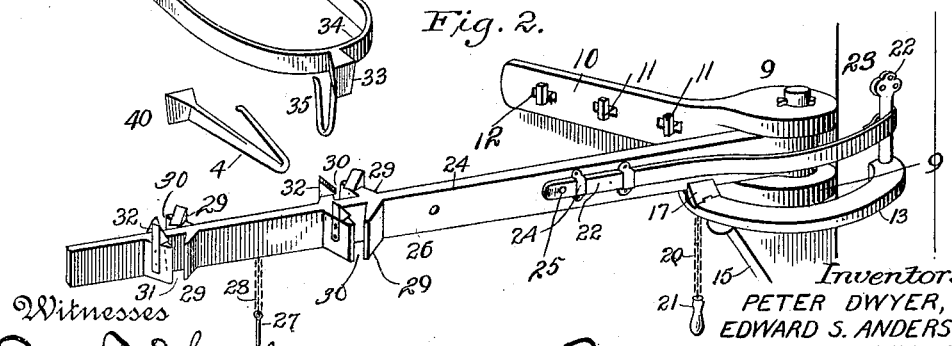

In the accompanying drawings, forming part of this specification, Figure 1 represents a perspective view of a portion of a mail-car provided with our invention in the act of transferring the mail-sacks at the station. Fig. 2 represents an enlarged detail perspective view of the attachment for the car with the bag-support and bag-hook in detached positions. Fig. 3 represents an enlarged detail perspective view of the upper portion of the standard and its movable arms arranged for a single track. Fig. 4 represents an enlarged detail perspective view of the upper end of one of the standards for a double track. Fig. 5 represents an enlarged detail perspective view of the supporting-ring for the car-arm. Fig. 6 represents an enlarged detail perspective view of the bag-engaging hook mounted on the car-arm. Fig. 7 represents a side elevation, partly in section and broken away, of one of the bag-holding yokes; and Fig. 8 represents a detail side elevation, partly broken away, of one of the mail-receptacles.

1 in the drawings represents a car; 2, the swinging arm mounted upon the same; 3, the bag-support, mounted on said arm; 4, the bag-hook, also mounted on the said arm; 5, the supporting-standard, mounted beside the road-bed; 6 6, swinging arms mounted upon the same; 7, the bag-support, mounted on one of said arms, and 8 the bag-hook, mounted on the remaining standard-arm. The arm 2 is pivotally mounted at its inner end between two spaced lugs 9 9, formed upon a casting 10, which is secured to the side of the mail-car by means of turn-bolts 11, which pass through elongated slots 12, formed in said casting. By this peculiar manner of connecting the casting to the car it may be changed from one side of the car to the other at will. This action is particularly desirable upon single-track lines, where the mail may be snatched from both sides of the track. Said arm 2 is supported in position by a segmental casting 13, having attaching-flanges 14 at its respective ends. The casting is held and braced in a horizontal position by an inclined brace-bar 15, connected thereto and to the side of the car. The upper surface of the said support is formed with a rigid shoulder 16 and a movable shoulder or catch 17. This latter is supported in position so as to project through an aperture 18, formed in the support, by a bow-spring 19, secured to the under side of said supporting-segment and also to the under side of the catch 17. A chain 20, having a handle 21, is also secured to the under side of the catch 17, so that the latter may be depressed against the tension of the spring 19 when so desired.

When the arm 2 is swung out at right angles to the car-door, the catch 17 is depressed until the arm has passed the same, when it snaps up back of said arm and thus holds the latter firmly in position between it and the shoulder 16. When it is desired to return the arm within the car, the handle 21 is grasped and the catch 17 depressed, as before described.

A spring 22 has one end rigidly secured to a suitable attaching-plate 23 upon the door-frame and its opposite end mounted in metallic loops 24, secured to the side of the arm 2. By this construction the said arm 2 is normally held within the car-door and can only be forced outward by overcoming the tension of said spring 22. In order to lock said arm within the door-casing when not in use, the said spring 22 is provided with an aperture 25, adapted to correspond with a similar aperture 26 in said arm 2. A pin 27, connected to the arm 2 by a chain 28, is passed through these apertures when in this coinciding position, thus locking the spring and the arm firmly together. The outer end of said arm is provided on each side with two pairs of spaced lugs 29 29, each of which is so cut upon its inner face as to form two tapering dovetailed recesses 30 and 31, respectively. Each of the projections 29 is also provided with a headed spring-catch 32, the use of which will be hereinafter more particularly described.

The recess 30 is adapted to receive a tapering dovetailed wedge 33, mounted upon the inner end of a bag-supporting yoke 34. This yoke is also provided with a pendent spring-hook 35, adapted to engage a loop 36, mounted upon the bag-receptacle 37, the bill of the hook being inclined and yielding to permit the escape of said receptacle. This receptacle 37, which is preferably constructed of leather and designed to contain the mail-bag, is also provided at each side with a hook 38, which hooks are adapted to pass over the respective arms of the yokes 34. In order to hold these hooks firmly in position and prevent them from jumping over the arms of the yoke, we mount springs 39 upon the latter in such manner that their free ends engage the upper portions of said hooks when in position, and thus hold them down firmly in place. Further, when said bag-support is applied in position by inserting the dovetailed projection 33 into the recess 30 the catches 32 are forced back until said projection has entered said recess, when they spring forward and catch over the upper end of the same, and thus hold it firmly in position. The recess 31 is similar in every respect to the recess 30 and is adapted to receive a dovetail projection 40, similar to the projection 33, but mounted upon the end of a bag-engaging hook 4. The said bag-receiving receptacle 37 is further provided with a bail 42 and a plurality of loops 43, arranged in proximity to its upper edge and adapted to receive a draw-strap 44, whereby the mouth of said receptacle may be drawn together to prevent the mail-bag from jumping out of the same. Both the hook and yoke may thus be shifted from one side of the arm to the other, according to the direction in which the car is moving.

The standard 5, which is adapted to be mounted upon the road-bed beside a single track, is of any ordinary material and construction. This standard is provided at its upper end with two spaced pivoted arms 6 6, which are supported in a horizontal position by segmental castings 45, each of which has its respective opposite ends secured to the opposite sides of the standard 5. Each of said castings is further braced and held rigidly in a horizontal position by an inclined bracing-rod 46, connected to the under side of the same and to the standard 5. Each of said castings is also provided at each end with a rigid shoulder and catch adapted to engage and hold said arms 6 either to one side or the other in a similar manner to the shoulders and catches 16 and 17. In order to hold said arms 6 6 in their operative positions, but still permit them to yield against any sudden shock or concussion, we hinge angular plates 47 to the respective opposite sides of the standard 5 and provide the same with coil-springs 47', the free ends of which are adapted to engage either one or the other side of either of the arms 6 when said hinged portions 47 are turned into operative position and enable the spring to offer resistance to the swinging of the arm. Each of said portions 47 is provided upon its rear surface with an eye 48, adapted to be engaged by a pivoted hook 49, mounted upon the standard, so as to hold said portion 47 in its operative position.

It will be observed from the above that when the spring upon one side of the standard is adjusted into operative position that upon the opposite side is thrown back out of the way, as shown in the drawings. By this means the arms 6 6 may be restrained against movement in either direction, so that they may be utilized for holding and receiving the mail from trains approaching from either direction. When the arms 6 6 are not in operative position, they are locked parallel with the track by the catches mounted upon the segmental castings 45. The lower arm 6 is provided with a bag-support 7, which latter is similar in every respect to the bag-support 3 and is removably mounted in the same manner as said support 3 and also similarly adjustable from side to side of its supporting-arm. The upper arm 6 is provided with a bag-engaging hook 8, which is removably secured thereto in the same manner as the support 7. This hook comprises a hook portion proper, 50, and a spring-pressed catch portion 51, adapted to close the opening of the hook after the bag has been hooked thereon.

The relative position of the arms 6 6 is such that as the mail-car approaches one of the receptacles 37, suspended on the support 7, the arm 2 passes between said arms 6 6, so that the hook 8 will engage the bail of the receptacle 37, mounted upon the support 3, while the hook 4 will engage the bail of the receptacle mounted upon the support 7. An instant transfer of the sacks will thus be made without any danger of loss or injury to the same. As the respective receptacles 37 are engaged by the hooks 4 and 8, the hooks 38 slide along the arms of the respective yokes until disengaged from the same.

It will be observed from the foregoing description that the several parts of the arm 2 can readily be detached, so that should either the support 3 or the hook 4 become injured a new support or hook may be instantly inserted in lieu thereof by simply pressing back the catches 32 and removing the projections 33 and 40, which carry said hook and support, respectively. Further, after the hook 8 has passed through the bail of the sack-receptacle suspended upon the support 3 said bail depresses the catch 51 and passes into the interior of the hook and is thus firmly locked in position.

In the modified form of our invention shown in Fig. 4 the arms are removably secured to the standard by any suitable detachable hinge 48, said hinge-sections being secured to the opposite sides of said standard, so that the arms may be adjusted to extend to either one or the other side of said standard and project therefrom over one or the other of the tracks of a double line. The standard in this application of our invention is mounted in the space between the two tracks to permit of the above-mentioned adjustment of the supporting-arm. The angular spring holding-arms are also provided with removably-hinged sections, whereby they may be removed, inverted, and adjusted from one to the other side of the standard. In order to support the arms 6 6 in position, the segmental castings 45 are replaced by circular castings 52, extending entirely about the standard and supported in position by suitable inclined braces 53. These circular castings 52 are each provided with four of the arm-retaining devices, two for each side of the standards, so that the arms may be locked in the desired positions no matter to which side of the standard they may be secured. The operation of this latter form of our invention is practically the same as that above described.

The transfer of the respective bag-holding receptacles at the station takes place without any slackening of the speed of the train and with perfect security, as the operations of the respective devices are positive.

Having thus described our invention, what we claim as new, and desire to secure by Letters Patent, is—

1. The combination with an arm adapted to be pivotally connected to a mail-car, of a bag-supporting yoke, and a bag-engaging hook both detachably mounted on said arm, and provision whereby said yoke and hook may be shifted from one side of the arm to the other, substantially as described.

2. The combination with an arm adapted to be pivotally mounted upon a mail-car, of a spring having one end movably mounted on said arm and the other connected to the said car, and a mail-bag support mounted on said arm, substantially as described.

3. The combination with an arm adapted to be pivotally mounted upon a mail-car, of a yoke mounted on said arm, and a bag-engaging hook mounted in said yoke, substantially as described.

4. The combination with an arm adapted to be pivotally connected to a mail-car, of a spring for normally holding said arm within the body of the car, a detachable yoke mounted on said arm and a detachable bag-hook also mounted on said arm, substantially as described.

5. The combination with an arm adapted to be pivotally connected to a mail-car and to swing horizontally, and a laterally-projecting and detachable bag-support and bag-hook, of a standard adapted to be mounted by the side of the track and carrying a plurality of arms, a bag-supporting yoke and a bag-engaging hook, both the yoke and hook being removably fitted in sockets on said arms, substantially as described.

6. The combination with an arm adapted to be pivotally connected to a mail-car and to swing horizontally, of a bag-support and bag-engaging hook mounted on said arm, a standard adapted to be mounted by the side of the track, two arms pivotally mounted to swing horizontally on said standard, springs for resisting the horizontal movement of said arms, a bag-support mounted on one of said arms, and a bag-engaging hook mounted on the other arm, substantially as described.

7. The combination with a mail-car, of an arm pivotally mounted thereon, a segmental support also mounted on said car and supporting said arm, and a catch mounted on said support and adapted to hold said arm in its set position, and a mail-bag support mounted on said arm, substantially as described.

8. The combination with an arm adapted to be pivotally connected to a mail-car, of a bag-receptacle having suspension-hooks, a bag-supporting yoke mounted on said car and having parallel arms, and retaining-springs mounted on both arms of said yoke and adapted to engage the hooks on the bag-receptacle to hold the same in position, substantially as described.

9. The combination with an arm adapted to be pivotally connected to a mail-car, of a bag-supporting yoke mounted thereon, and a bag having a bail and hooks arranged upon diametrically opposite sides and adapted to hook over the respective arms of the yoke, substantially as described.

10. The combination with a mail-car, of an arm pivotally mounted thereon, a standard adapted to be mounted by the side of the track, two arms pivotally mounted on said standard, movable springs mounted upon the opposite sides of said arms so that they may be adjusted to engage the same at will, a bag-hook mounted on one of said arms and a bag-supporting yoke on the other arm, substantially as described.

11. The combination with bag-catching means, adapted to be connected to a mail-car, a standard adapted to be secured by the side of the track, two arms pivotally mounted on said standard, segmental castings for supporting said arms, spring-catches upon said castings for holding said arms in their adjusted position, and bag-holding devices mounted on said arms, substantially as described.

12. The combination with bag-catching means adapted to be secured to a mail-car, of a standard adapted to be mounted by the side of the track, a plurality of arms pivoted upon said standard and each provided upon its opposite sides with support-attaching means, and bag-supporting yokes and catching-hooks adapted to be secured by said means to either side of the respective arms, substantially as described.

In testimony whereof we have signed this specification in the presence of two subscribing witnesses.

PETER DWYER.
EDWARD S. ANDERSON.
JOSEPH MELLINA.

Witnesses:
JOHN BOWIE,
THOMAS S. ANDERSON.